W. P. DORL.
VEHICLE TOP.
APPLICATION FILED FEB. 20, 1914.
1,121,553.
Patented Dec. 15, 1914.
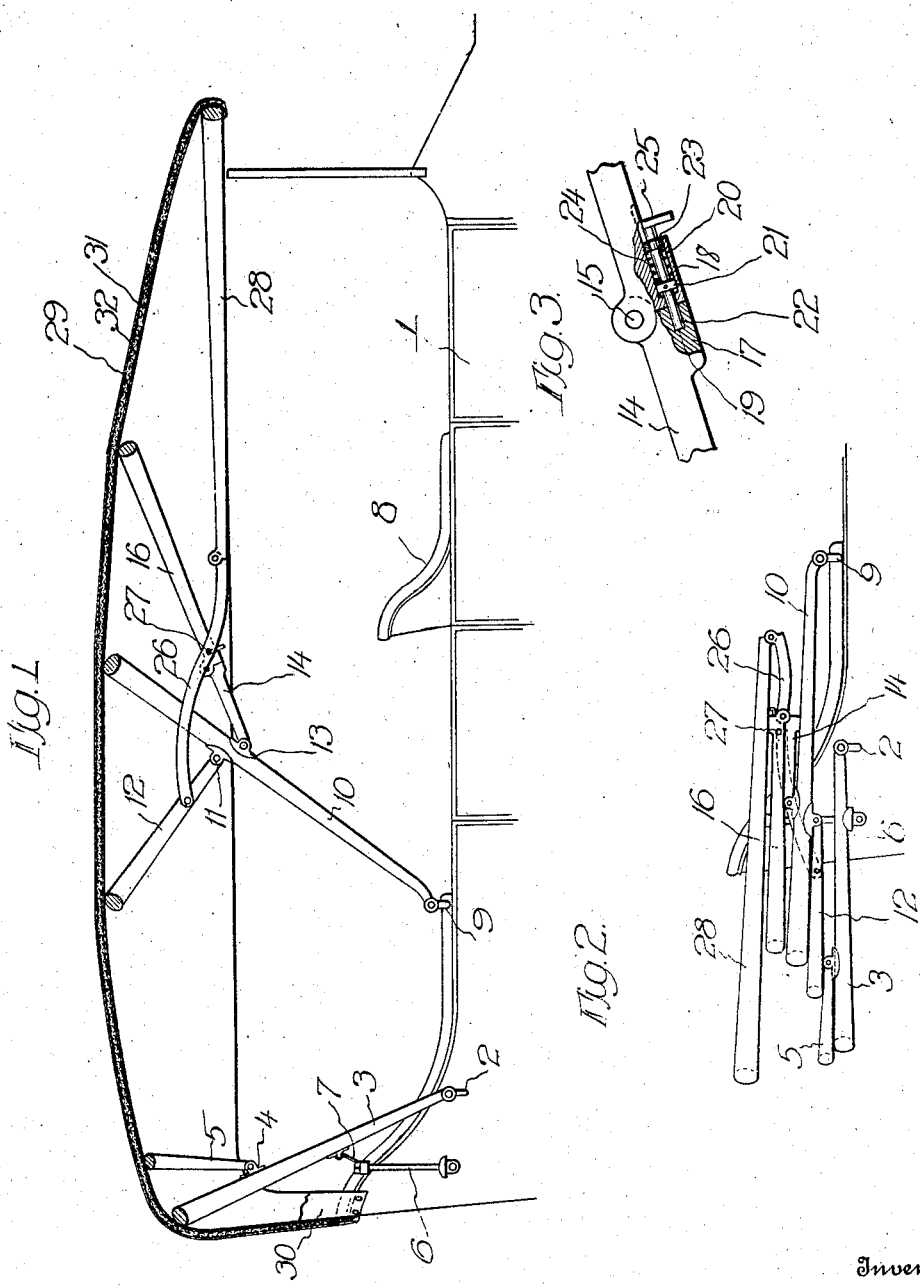
Witnesses
Inventor
Walter P. Dorl
By
Attorneys

UNITED STATES PATENT OFFICE.

WALTER P. DORL, OF DETROIT, MICHIGAN, ASSIGNOR TO DORL-WILEY ONE LADY AUTO TOP COMPANY, A CORPORATION OF MICHIGAN.

VEHICLE-TOP.

1,121,553.  Specification of Letters Patent.  Patented Dec. 15, 1914.

Application filed February 20, 1914. Serial No. 819,862.

*To all whom it may concern:*

Be it known that I, WALTER P. DORL, a citizen of the United States of America, residing at Detroit, in the county of Wayne and State of Michigan, have invented certain new and useful Improvements in Vehicle-Tops, of which the following is a specification, reference being had therein to the accompanying drawings.

This invention relates to vehicle tops and is an improvement in connection with the vehicle top disclosed by my pending application, filed Oct. 8th, 1913, Serial No. 794,028.

The object of the present invention is to provide a durable and rigid vehicle top that is supported in a set-up position without any strain upon the cover of the top, and provision is made whereby the top can be easily and quickly folded or collapsed.

With the above and other objects in view the invention resides in the novel construction, combination and arrangement of parts to be hereinafter specifically described and then claimed.

Reference will now be had to the drawing, wherein—Figure 1 is a longitudinal sectional view of the vehicle top taken through one of the pads or reinforcements thereof; Fig. 2 is a side elevation of the top in a folded position, and Fig. 3 is an enlarged detailed sectional view of a latch adapted to form part of the vehicle top.

In the drawing, the reference numeral 1 denotes a portion of an automobile body and secured to the sides of the body, at the rear end thereof, in the ordinary and well known manner, are brackets or rear irons 2 to which are pivotally connected the lower ends of a rear bow 3. The front sides of the bow 3 are provided with bearings 4 and pivotally connected to said bearings are the ends of an auxiliary rear bow 5. The main rear bow 3 is in proximity to rest arms 6 carried by the sides of the body 1 and when the main rear bow is in an extended or set-up position, the sides of said bow are connected by straps 7 or other fastening means to the rest arms 6.

Instead of locating forward side irons adjacent to the front seat 8 of the automobile body, the irons are located at the rear seat of the automobile and at the forward ends of the arms of said seat. The irons are designated 9 and pivotally connected thereto are the lower ends of a front supporting bow 10. The rear sides of the front supporting bow are provided with bearings 11 and pivotally connected to said bearings are the ends of a rear bracing bow 12. The front sides of the front supporting bow 10 are provided with bearings 13 contiguous to the bearings 11 and pivotally connected to the bearings 13 are links 14 having hinge connections 15 with the ends of a front bracing bow 16. The hinge connections 15 are constructed somewhat similar to a rule joint and with the front bracing bow in a set-up position the ends thereof abut the ends of the links 14. The confronting ends of the links 14 and the front bracing bow 16 have enlargements 17 and 18 respectively, the enlargement 17 having a socket 19 and the enlargement 18 a longitudinal bore 20. The outer end of the bore 20 is enlarged to accommodate the slide head 21 of a bolt 22 arranged longitudinally of the bore 20 and adapted to engage in the socket 19 to hold the sides of the front bracing bow 16 and the links 14 in longitudinal alinement. The bolt 22 is slidable in a bushing or retaining ring 23 mounted in the outer end of the bore 20 and encircling said bolt, between the bushing 23 and the slide head 21, is a coiled compression spring 24, said spring retaining the bolt 22 in an extended position. The outer end of the bolt 22 has a suitable handle or extension 25 that permits of the bolt 22 being easily retracted when it is desired to fold or collapse the vehicle top.

Pivotally connected to the outer sides of the rear bracing bow 12 are compound curved links 26 that are pivotally connected intermediate their ends by pins 27 to the outer side of the front bracing bow 16, adjacent to the hinge connections thereof. The forward ends of the compound curved links 26 have hinge connections with a horizontal bow 28, the ends of said bow abutting the ends of the links 26 to form a rigid connection when the vehicle top is in a set-up position.

The bows 3, 5, 10, 12, 16 and 28 coöperate in supporting a cover or canopy 29, which extends from a back stay 30 to the forward end of the horizontal bow 28. The cover 29 has a pair of longitudinal pads or cases 31 and arranged in said pads or cases are chains 32 or other flexible metallic tying members that extend from the back stay 30 to the forward end of the horizontal bow 28, said members relieving the cover of stresses and strains when the vehicle top is in a set-up position.

By reference to Fig. 1 it will be observed that occupants of the rear seat of the vehicle will have an unobstructed side view, and that with the bows disposed at the angles shown it is practically impossible for the top to accidentally collapse. Furthermore, the top reaches well over the front seat of the vehicle and it is in this connection that the top can be used with a vehicle having one or more seats.

When the vehicle top is folded or collapsed and supported by the rest arms 6 it occupies a very small space at the rear end of a body and the arrangement of the bows is such that the top can be easily and quickly placed in a set-up position.

This improvement is susceptible to such variations and modifications as fall within the scope of the appended claims.

What I claim is:—

1. In a vehicle top, the combination with a vehicle body having the rear end thereof provided with sets of side irons, of a rear main bow pivotally supported by one set of irons, a front supporting bow pivotally connected to the other set of irons, a rear bracing bow pivotally connected to said front supporting bow, links pivotally connected to said front supporting bow, a front bracing bow having hinge connections with said links, curved links pivotally connected to said rear bracing bow and to said front bracing bow, a horizontal bow having hinge connections with said curved links, and a cover supported by all of said bows.

2. In a vehicle top, the combination with a vehicle body, of a rear bow pivotally supported at the rear end of said body, an auxiliary bow pivotally carried thereby, a front supporting bow pivotally supported at the rear end of said body, links pivotally connected to said front supporting bow, a front bracing bow having hinge connections with said links, means for maintaining said front bracing bow rigid relatively to said links, a rear bracing bow pivotally supported by said front supporting bow, a horizontal bow, means connecting said horizontal bow to said rear and front bracing bows, and a cover supported by said bows.

3. In a vehicle top, the combination with a vehicle body, of a rear bow pivotally supported at the rear end of said body, an auxiliary bow pivotally carried thereby, a front supporting bow pivotally supported at the rear end of said body, links pivotally connected to said front supporting bow, a front bracing bow having hinge connections with said links, means for maintaining said front bracing bow rigid relatively to said links, a rear bracing bow pivotally supported by said front supporting bow, a horizontal bow, means connecting said horizontal bow to said front and rear bracing bows, a cover supported by said bows, and means carried by said cover and connected to the rear end of said body and extending to said horizontal bow adapted to relieve said cover of strains by said bows.

4. In a vehicle top, the combination with a vehicle body, and side irons carried by the rear end of said body, of a main rear bow pivotally supported by some of said irons, an auxiliary rear bow pivotally connected to said main rear bow, a front supporting bow pivotally supported by the other of said irons, a rear bracing bow pivotally supported by said front bow, links pivotally connected to said front bow, a front bracing bow carried by said links and adapted to be rigidly held relatively thereto, curved links pivotally connected to said rear bracing bow and to said front bracing bow, a horizontal bow having hinge connections with said links, a cover supported by all of said bows, and means extending longitudinally of said cover and connected to the rear end of said vehicle body, for bracing all of said bows and relieving said cover of strains by said bows.

5. In a vehicle top, the combination with a vehicle body having the rear end thereof provided with a set of side irons, of a front supporting bow pivotally connected to said set of irons, a rear bracing bow pivotally connected to said front supporting bow, links pivotally connected to said front supporting bow, a front bracing bow having hinged connections with said links, curved links pivotally connected to said rear bracing bow and to said front bracing bow, a horizontal bow having hinged connections with curved links, and a cover supported by all of said bows.

6. In a vehicle top, the combination with a vehicle body and sets of side irons carried by the rear end of said body, of a main rear bow pivotally connected to one set of irons, an auxiliary bow pivotally connected to said rear bow, a front supporting bow pivotally connected to the other set of irons, rear and front bracing bows pivotally connected to said front bow, a horizontal bow, means connecting said horizontal bow to said front and rear bracing bows, a cover supported by all of said bows, and means extending longitudinally of said cover and connected to the rear end of said vehicle body for bracing all of said bows and relieving said cover of strains by said bows.

7. In a vehicle top, the combination with a vehicle body, and sets of side irons carried by the rear end of said body, of a main rear bow pivotally connected to one set of irons, an auxiliary bow pivotally connected to said rear bow, a front supporting bow pivotally connected to the other set of irons, rear and front bracing bows pivotally connected to said front bow, a horizontal bow, means connecting said horizontal bow to said front and rear bracing bows, a cover supported by all of said bows, cases longitudinally of said cover, and chains within said cases connected to the rear end of said body and to said horizontal bow.

In testimony whereof I affix my signature in presence of two witnesses.

WALTER P. DORL.

Witnesses:
 ANNA M. DORR,
 LEWIS E. FLANDERS.

Copies of this patent may be obtained for five cents each, by addressing the "Commissioner of Patents, Washington, D. C."